I. MITCHELL.
EXPANDING FRICTION BRAKE FOR MOTOR VEHICLES.
APPLICATION FILED OCT. 27, 1914.
1,176,393.
Patented Mar. 21, 1916.
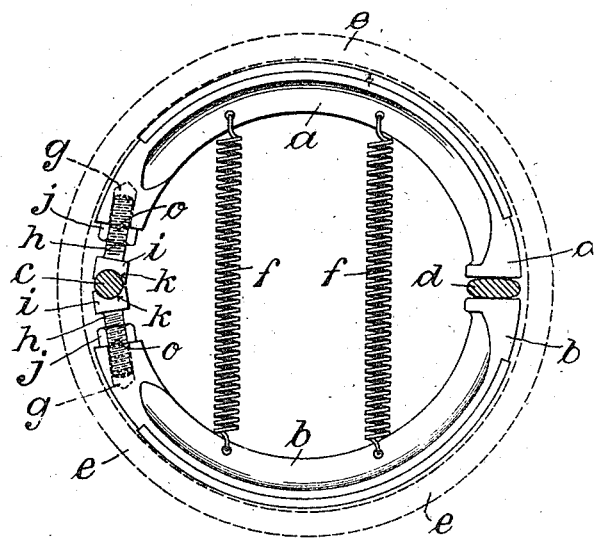
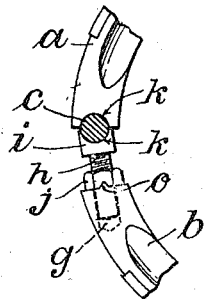
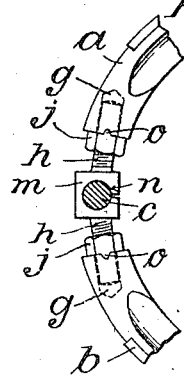
Witnesses:
Waldo M. Chapin
Joseph Buckley
Inventor:
Isaac Mitchell
By his Attorneys
Rosenbaum, Stockbridge & Borst

UNITED STATES PATENT OFFICE.

ISAAC MITCHELL, OF BROCKHOLES, NEAR HUDDERSFIELD, ENGLAND.

EXPANDING FRICTION-BRAKE FOR MOTOR-VEHICLES.

1,176,393.  Specification of Letters Patent.  Patented Mar. 21, 1916.

Application filed October 27, 1914. Serial No. 868,835.

*To all whom it may concern:*

Be it known that I, ISAAC MITCHELL, a subject of the King of Great Britain and Ireland, and a resident of Brockholes, near Huddersfield, in the county of York, England, have invented new and useful Improvements in or Appertaining to Expanding Friction-Brakes for Motor-Vehicles, of which the following is a specification.

This invention relates to circular friction brake devices which are made in two separate halves or sections pivoting at one side on a common stud and adapted at the opposite side to be forced apart or away from each other by a cam or like device to expand the brake surface against the inner surface of a rim on the wheel or driven part to apply the desired brake pressure. As the brake surfaces wear, the brake becomes more and more inefficient and there being no means provided in said type of brake for adjusting the device to compensate for such wear and tear, the brake has to be renewed or a new one applied in its place after very little service. In other types of internal brake devices the brake blocks have been adjustable bodily to or from the inner surface of the brake drum by nuts on screwed shafts carrying pinions for actuating the brake blocks, the nuts engaging each end of each brake block. In internal brake devices in which the brake blocks are pivoted on a common stud, the free end of one block has been adjustably connected to the operating lever pivoted on the other block, any adjustment made affecting equally the two blocks. In external brake devices, adjusting bolts or connections provided with means for adjusting same have been employed to compensate for wear of the braking surfaces.

The object of my invention is to provide, in conjunction with a brake device of the type referred to, means whereby the said device can be readily adjusted from time to time to any desired extent to compensate for wear and tear.

My invention will be described with reference to the accompanying drawings in which—

Figure 1 is a face view of an expanding friction brake device of the class referred to and having the preferred embodiment of my invention applied thereto, and Figs. 2 and 3 show modified or alternative embodiments which will be particularly referred to hereafter.

Referring to the drawing, and first to Fig. 1, $a$ and $b$ represent the two halves of sections of the brake and $c$ the stud on which they pivot. $d$ represents the usual cam or like device located between the opposite ends of the brake sections and acting, when manually operated through suitable connections, to force said ends of the brake sections apart and expand them against the inner surface of a rim or annulus on the wheel or driven part, such rim or annulus being represented by $e$. Springs $f$, $f$ connect the two halves or sections of the brake and act to normally hold them out of contact with $e$.

As previously stated, my object is to provide means whereby a brake device of this type can be readily adjusted to compensate for wear of the parts.

In carrying out my invention, according to the form now being referred to, I make the two halves or sections of the brake somewhat shorter at the pivot end than is usual and instead of forming them with half-circular recesses to engage the pivot stud as ordinarily, I form each of them with a recess $g$ into which is adapted to loosely enter the screwed shank $h$ of a separate adjusting piece $i$. Each shank $h$ is provided with an adjusting nut $j$ one face of which bears against the respective end of the brake section, and the part $i$ has a partly circular recess $k$ adapted to bear against the pivot stud.

In some cases one section only of the brake may be provided with a separate adjusting piece as above set forth, the other section being made as at present, as shown in Fig. 2. In this arrangement the lower brake section is preferably the one to which the adjusting piece is applied.

In another arrangement one split part or block $m$ having an opening $n$ therein to accommodate the pivot stud, may have two screwed shanks projecting at suitable angles from opposite sides thereof as shown at Fig. 3, the shanks entering recesses in the ends of the respective brake sections and being provided with adjusting nuts in the same manner as in the arrangement previously referred to. Or instead of the block $m$ having two shanks integral therewith, I may provide each shank with a head having an opening therein to receive the pivot stud, the two heads occupying positions adjacent to each other on said pivot stud.

In each of the arrangements or embodiments of the invention described, the adjusting nuts are preferably provided with cross grooves or recesses adapted to be engaged by projections or ribs $o$ on the ends of the brake section, as shown in Figs. 1 and 2, so as to lock the said nuts and prevent them from accidentally rotating after they have been adjusted to cause the brake sections to occupy the positions desired. Alternatively, the ribs or projections may be formed on the nuts and the recesses or grooves in the ends of the brake sections as shown at Fig. 3. The projections and recesses may be arranged to lock the nuts at each half revolution, or at each quarter of a revolution if a finer adjustment of the brake sections be desired.

The means set forth enable me to most effectively compensate for wear of the parts or to vary the frictional grip of the brake section or the rim or annulus. For instance, if in the case say of a motor vehicle, the shaft carrying the rim or annulus wears and allows the rim to drop somewhat, then the lower section or half of the brake becomes useless. By means of my improvements however, I am enabled to adjust the position of such lower section, so that it may have an efficient grip.

What I claim is:—

1. The combination, in an internal circular friction brake, of two brake sections having a recess in the end of each section, a common pivot for both sections at one side, a separate adjusting piece between each said section and the said common pivot, said adjusting piece comprising a screwed pin loosely engaging at its head with the said common pivot, and which pin freely enters the recess in the respective end of the brake section, and an adjusting nut upon the pin bearing against the end of the brake section, means for locking said adjusting nut and means for forcing the sections apart at the other side, substantially as described.

2. The combination, in an internal circular friction brake, of two brake sections having recesses in the ends of such brake sections, a common pivot for both sections at one side, an adjusting piece between each said section and the said common pivot, said adjusting piece comprising a split block riding upon the said common pivot, two screwed shanks projecting at suitable angles from opposite sides thereof and which shanks enter the recesses in the ends of the respective brake sections, adjusting nuts upon said shanks bearing against the ends of the brake sections, means for locking the said adjusting nuts and means for forcing the sections apart at the other end, substantially as described.

In witness whereof I have hereunto set my hand in the presence of two subscribing witnesses.

ISAAC MITCHELL.

Witnesses:
CHARLIE COOK,
HERBERT WHITE.